US007529939B2

(12) United States Patent
Bruwer

(10) Patent No.: US 7,529,939 B2
(45) Date of Patent: May 5, 2009

(54) METHOD OF AND APPARATUS FOR TRANSFERRING DATA

(75) Inventor: Frederick Johannes Bruwer, Paarl (ZA)

(73) Assignee: Azoteq Pty Ltd., Paarl (ZA)

( * ) Notice: Subject to any disclaimer, the term of this patent is extended or adjusted under 35 U.S.C. 154(b) by 697 days.

(21) Appl. No.: 10/014,664

(22) Filed: Dec. 14, 2001

(65) Prior Publication Data

US 2002/0110242 A1 Aug. 15, 2002

(30) Foreign Application Priority Data

Dec. 19, 2000 (ZA) ................................ 2000/7616

(51) Int. Cl.

| | |
|---|---|
| ***H04L 9/00*** | (2006.01) |
| ***H04L 9/28*** | (2006.01) |
| ***H04K 1/00*** | (2006.01) |
| ***G06F 15/177*** | (2006.01) |
| ***G06F 12/14*** | (2006.01) |
| ***G06F 1/04*** | (2006.01) |
| ***G06F 7/04*** | (2006.01) |
| ***G08B 29/00*** | (2006.01) |

(52) U.S. Cl. .......................... 713/170; 713/150; 713/1; 713/160; 713/168; 713/187; 713/502; 726/26; 726/34; 380/255; 380/28

(58) Field of Classification Search ............ 380/21-25; 340/825, 539; 713/170
See application file for complete search history.

(56) References Cited

U.S. PATENT DOCUMENTS

RE29,525 E 1/1978 Willmott
4,380,762 A 4/1983 Capasso
4,385,296 A 5/1983 Tsubaki et al.
4,426,637 A 1/1984 Apple et al.
4,529,960 A 7/1985 Uchida et al.
4,529,980 A 7/1985 Liotine et al.
4,535,333 A 8/1985 Twardowski
4,574,247 A 3/1986 Jacob
4,590,470 A 5/1986 Koenig (Continued)

FOREIGN PATENT DOCUMENTS

DE 41 41 766 A1 6/1993

(Continued)

OTHER PUBLICATIONS

Patel et al, Ensuring Secure Program Execution in Multiprocessor Embedded Systems: A Case Study, 2007, ACM, pp. 57-62.*

(Continued)

*Primary Examiner*—Christopher A Revak
*Assistant Examiner*—Aravind K Moorthy
(74) *Attorney, Agent, or Firm*—Jones, Tullar & Cooper, P.C.

(57) ABSTRACT

A method of securely transferring data from a transmitter to a receiver which includes the steps of at the transmitter encrypting data which at least in part is based on timer information at the transmitter, to form a transmission word, transmitting the transmission word to the receiver, at the receiver decrypting the transmission word, validating the transmission word by comparing the transmitted timer information to predetermined information at the receiver; and when a valid transmission word is received adjusting the said predetermined information.

38 Claims, 9 Drawing Sheets

Encoder Block Diagram

U.S. PATENT DOCUMENTS

| | | | | | |
|---|---|---|---|---|---|
| 4,596,985 | A | | 6/1986 | Bongard et al. | |
| 4,638,433 | A | | 1/1987 | Schindler | |
| 4,652,860 | A | | 3/1987 | Weishaupt | |
| 4,686,529 | A | | 8/1987 | Kleefeldt | |
| 4,723,121 | A | | 2/1988 | van den Boom et al. | |
| 4,737,770 | A | | 4/1988 | Brunius et al. | |
| 4,750,118 | A | | 6/1988 | Heitschel et al. | |
| 4,779,090 | A | | 10/1988 | Micznik et al. | |
| 4,835,407 | A | | 5/1989 | Kataoka et al. | |
| 4,847,614 | A | | 7/1989 | Keller | |
| 4,855,713 | A | | 8/1989 | Brunius | |
| 4,864,615 | A | | 9/1989 | Bennett et al. | |
| 4,878,052 | A | | 10/1989 | Schulze | |
| 4,881,148 | A | | 11/1989 | Lambropoulos et al. | |
| 4,890,108 | A | | 12/1989 | Drori et al. | |
| 4,912,463 | A | | 3/1990 | Li | |
| 4,928,098 | A | | 5/1990 | Dannhaeuser | |
| 4,931,789 | A | | 6/1990 | Pinnow | |
| 4,951,029 | A | | 8/1990 | Severson | |
| 4,951,247 | A | | 8/1990 | Kruse et al. | |
| 4,988,992 | A | | 1/1991 | Heitschel et al. | |
| 5,049,867 | A | | 9/1991 | Stouffer | |
| 5,055,701 | A | | 10/1991 | Takeuchi | |
| 5,103,221 | A | | 4/1992 | Memmola | |
| 5,107,258 | A | | 4/1992 | Soum | |
| 5,144,667 | A | | 9/1992 | Pogue, Jr. et al. | |
| 5,148,159 | A | | 9/1992 | Clark et al. | |
| 5,155,729 | A | * | 10/1992 | Rysko et al. | 714/11 |
| 5,191,610 | A | | 3/1993 | Hill et al. | |
| 5,224,163 | A | | 6/1993 | Gasser et al. | |
| 5,278,902 | A | * | 1/1994 | Nugent | 380/42 |
| 5,351,293 | A | | 9/1994 | Michener et al. | |
| 5,365,225 | A | | 11/1994 | Bachhuber | |
| 5,446,904 | A | * | 8/1995 | Belt et al. | 713/323 |
| 5,500,897 | A | * | 3/1996 | Hartman, Jr. | 713/178 |
| 5,561,420 | A | | 10/1996 | Kleefeldt et al. | |
| 5,686,904 | A | * | 11/1997 | Bruwer | 340/5.23 |
| 5,832,035 | A | * | 11/1998 | Fullerton | 375/149 |
| 5,917,873 | A | * | 6/1999 | Shiomoto et al. | 375/376 |
| 5,978,483 | A | * | 11/1999 | Thompson et al. | 380/262 |
| 6,009,131 | A | * | 12/1999 | Hiramatsu | 375/354 |
| 6,028,527 | A | * | 2/2000 | Soenen et al. | 340/5.26 |
| 6,154,544 | A | * | 11/2000 | Farris et al. | 380/262 |
| 6,191,701 | B1 | | 2/2001 | Bruwer | |
| 6,366,198 | B1 | * | 4/2002 | Allen et al. | 340/426.17 |
| 6,373,951 | B1 | * | 4/2002 | Jenkins et al. | 380/262 |
| 6,484,260 | B1 | * | 11/2002 | Scott et al. | 713/186 |
| 6,507,910 | B2 | * | 1/2003 | Kotani | 713/182 |
| 6,691,921 | B2 | * | 2/2004 | Endo et al. | 235/492 |
| 2002/0063796 | A1 | * | 5/2002 | Min | 348/523 |
| 2005/0135612 | A1 | * | 6/2005 | Evans | 380/43 |
| 2006/0271373 | A1 | * | 11/2006 | Khalil et al. | 704/500 |
| 2007/0002971 | A1 | * | 1/2007 | Purnhagen et al. | 375/316 |
| 2007/0242678 | A1 | * | 10/2007 | Fu et al. | 370/395.62 |
| 2008/0175342 | A1 | * | 7/2008 | Jang | 375/371 |

FOREIGN PATENT DOCUMENTS

| | | | | |
|---|---|---|---|---|
| EP | 0244332 | | | 11/1987 |
| EP | 0311112 | | | 4/1989 |
| EP | 0 459 781 | A1 | | 12/1991 |
| EP | 0 775 918 | A2 | | 5/1997 |
| EP | 0 983 916 | A1 | | 3/2000 |
| FR | 2678755 | A1 | | 1/1993 |
| FR | 2738587 | A1 | | 3/1997 |
| GB | 2257552 | A | | 1/1993 |
| WO | WO 96/37965 | A | | 11/1996 |
| WO | WO 2007005114 | A1 | * | 1/2007 |
| ZA | 91/04063 | | | 12/1992 |

OTHER PUBLICATIONS

Zhang et al, DSP security communication designing and implementation, 2003, IEEE, pp. 557-560.*

* cited by examiner

Fig. 1: Encoder Block Diagram
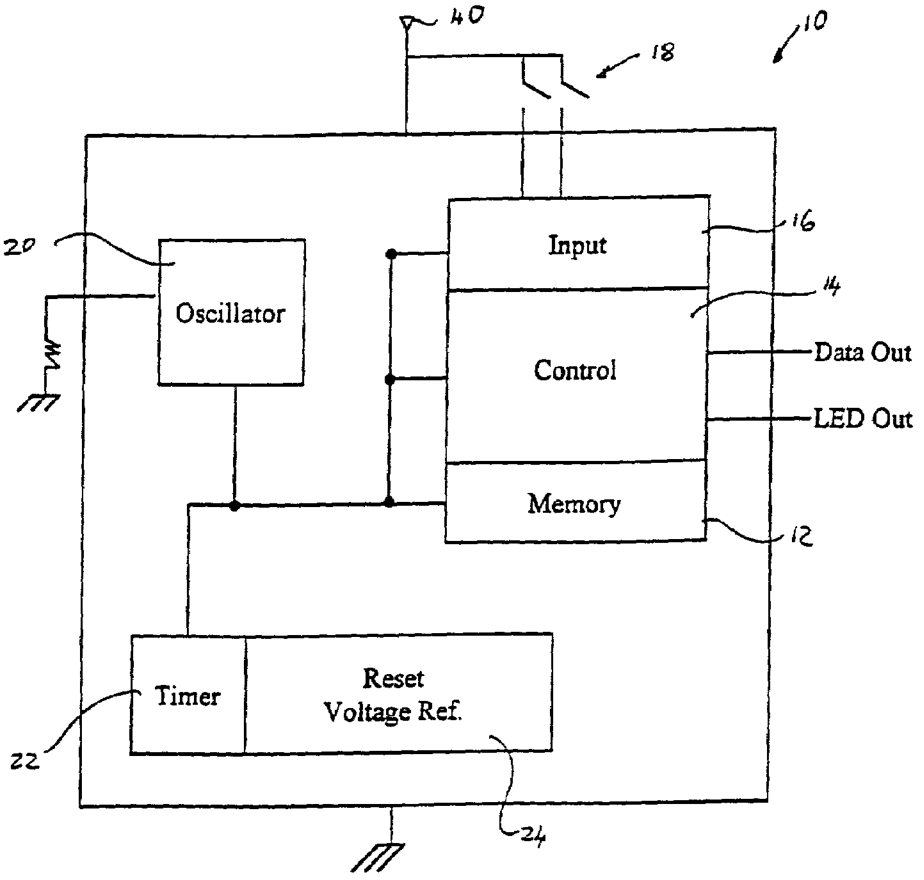
Fig. 2: Memory Map : Encoder
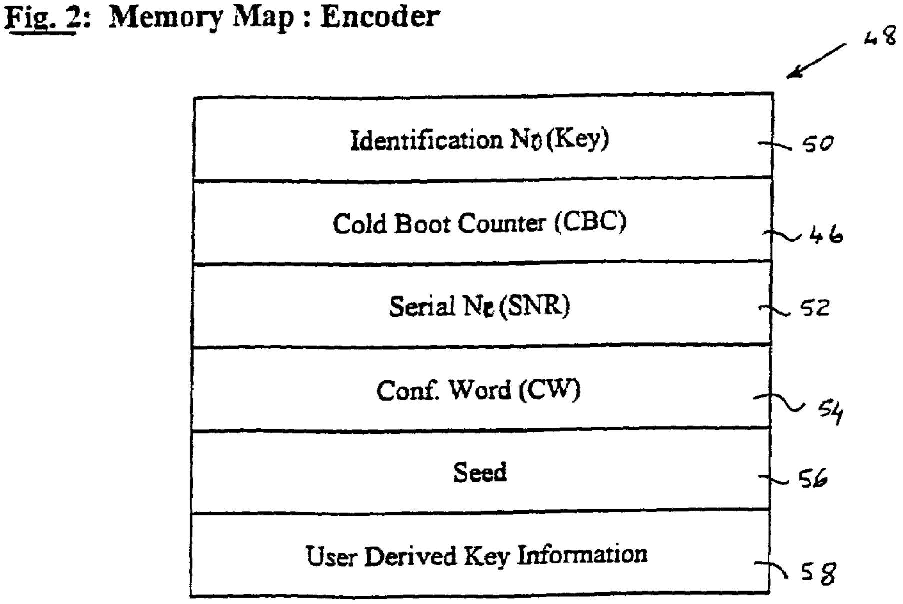

Fig. 3: Decoder : Block Diagram
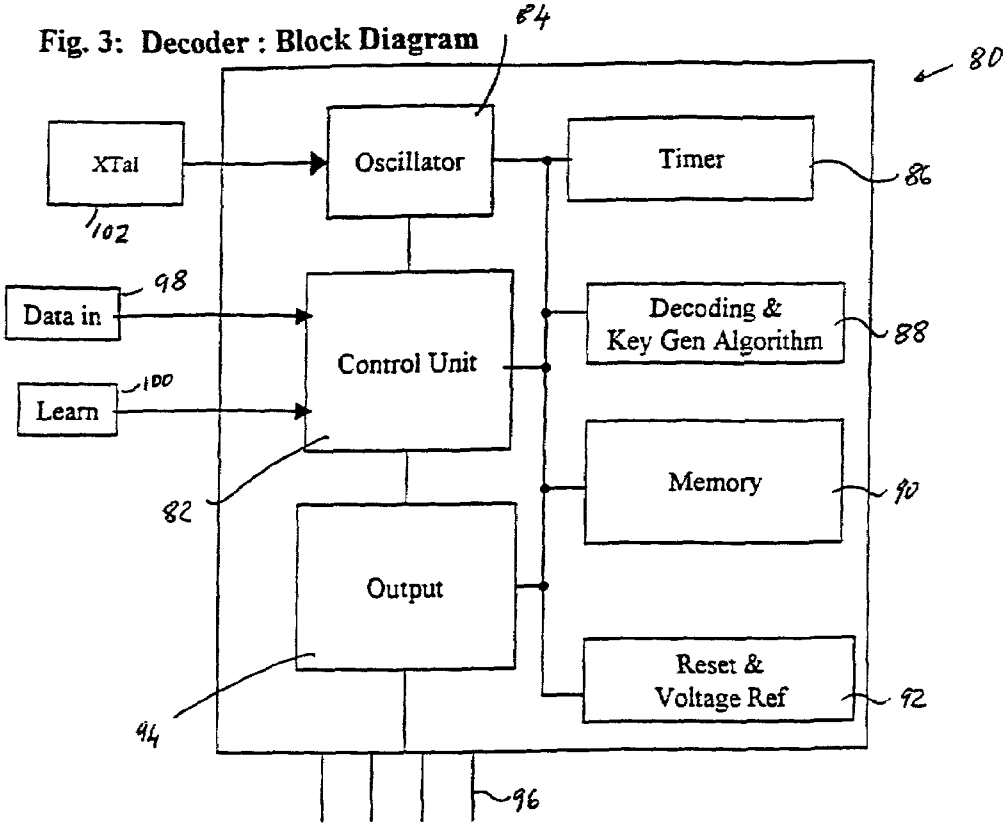
Fig. 4: Decoder Memory Map: Non-volatile memory
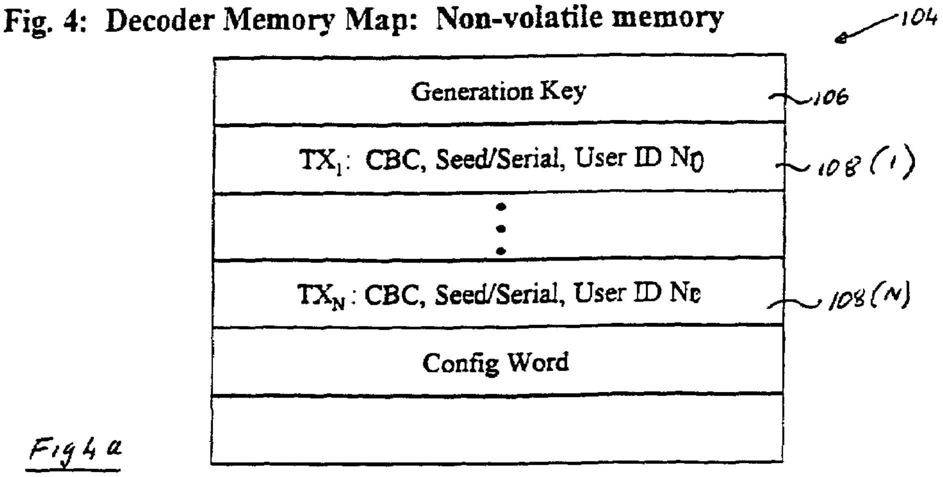
Fig 4a
Decoder: Volatile Memory Map
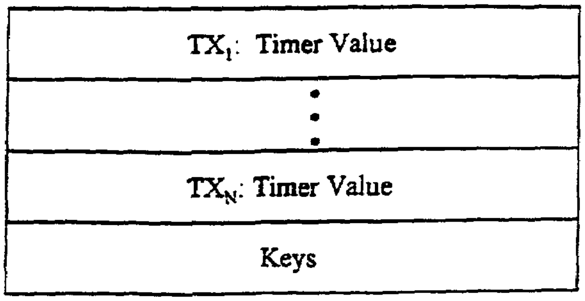

Fig. 5: Data Word

28

| 30 | 32 | 34 | 36 | 38 |
|---|---|---|---|---|
| Timer | Command | Portion of Serial Number | Fixed Code or User Derived Information | Utility * |

* repeat, battery level, shift levels

Fig. 6: Transmission Word

70

| 78 | 46 | 72 | 74 | 34 | 74 |
|---|---|---|---|---|---|
| CRC | CBC+ | Command * | Encrypted Data Word | Serial Number | Header |

* Info - repeat, battery level, shift levels
+ Only a portion need be sent with every transmission word

Fig. 7: Memory locations for learning encoders.

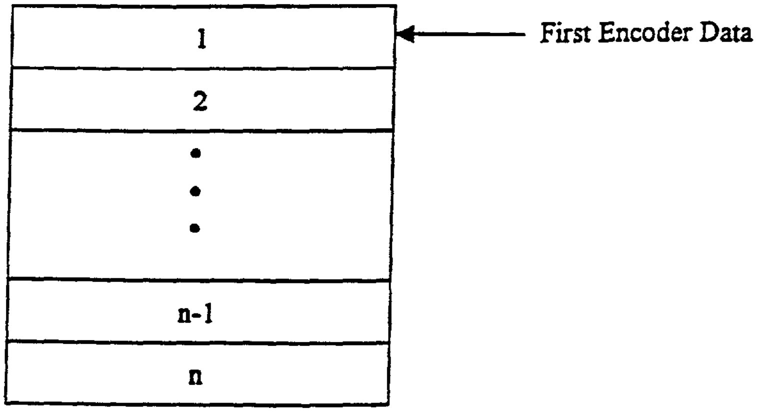

Fig. 8: Learning a second encoder

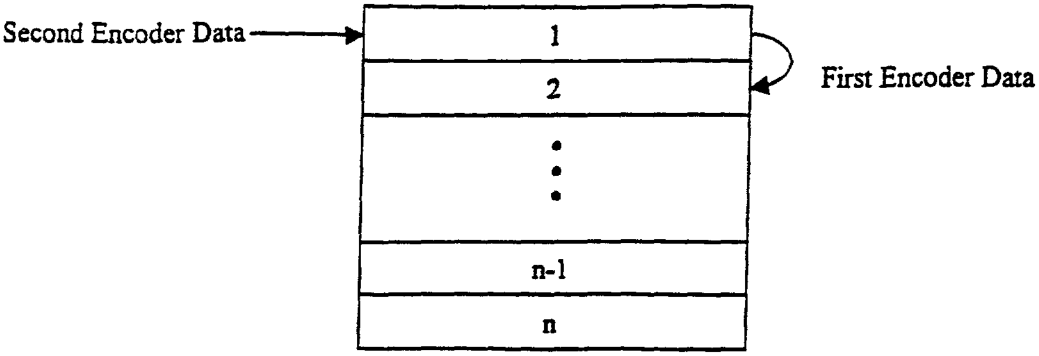

Fig. 9a : Encoder: Normal operation Part I
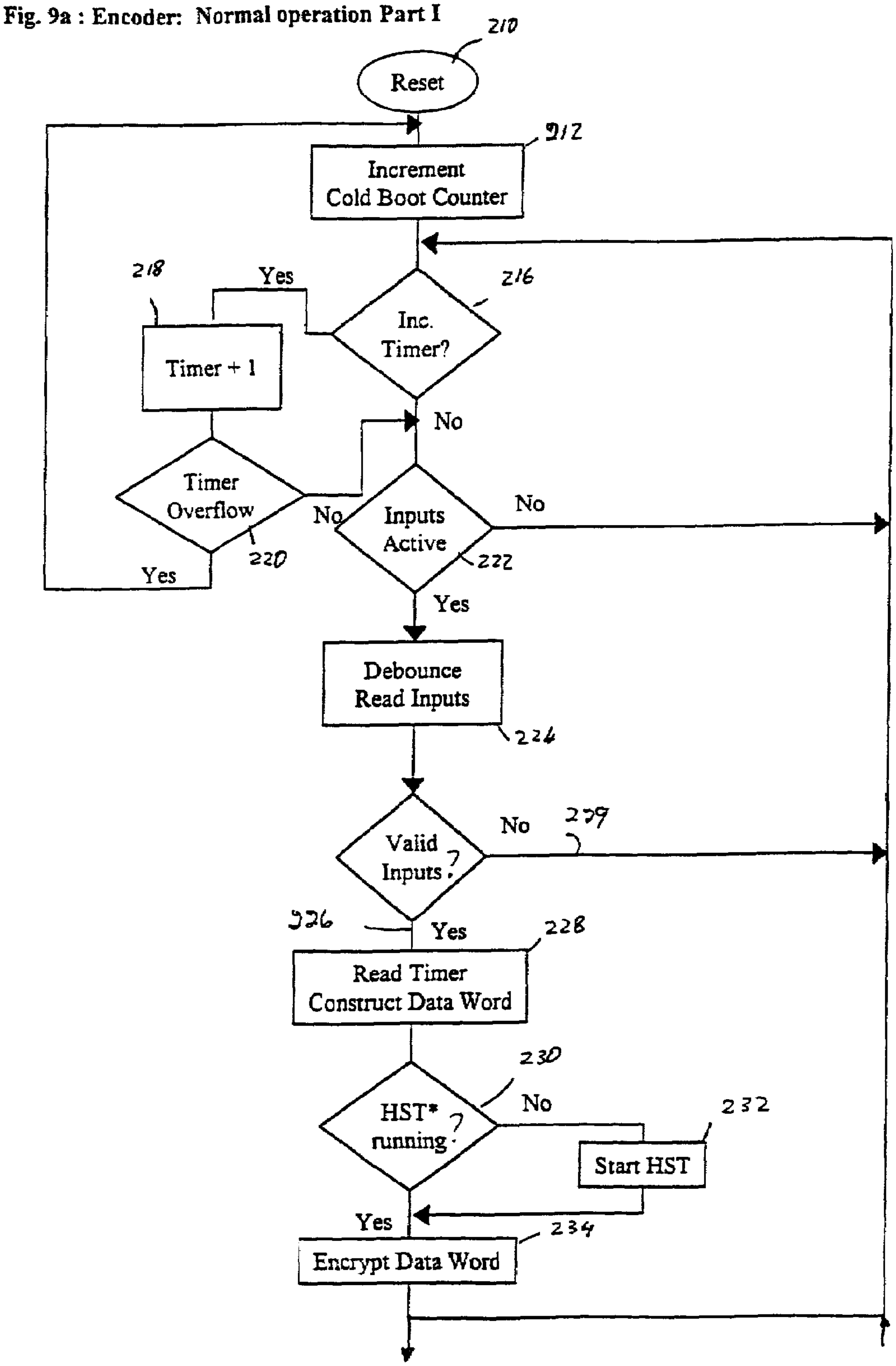
* High Speed Timer

Fig. 9b: Encoder: Normal operation Part II
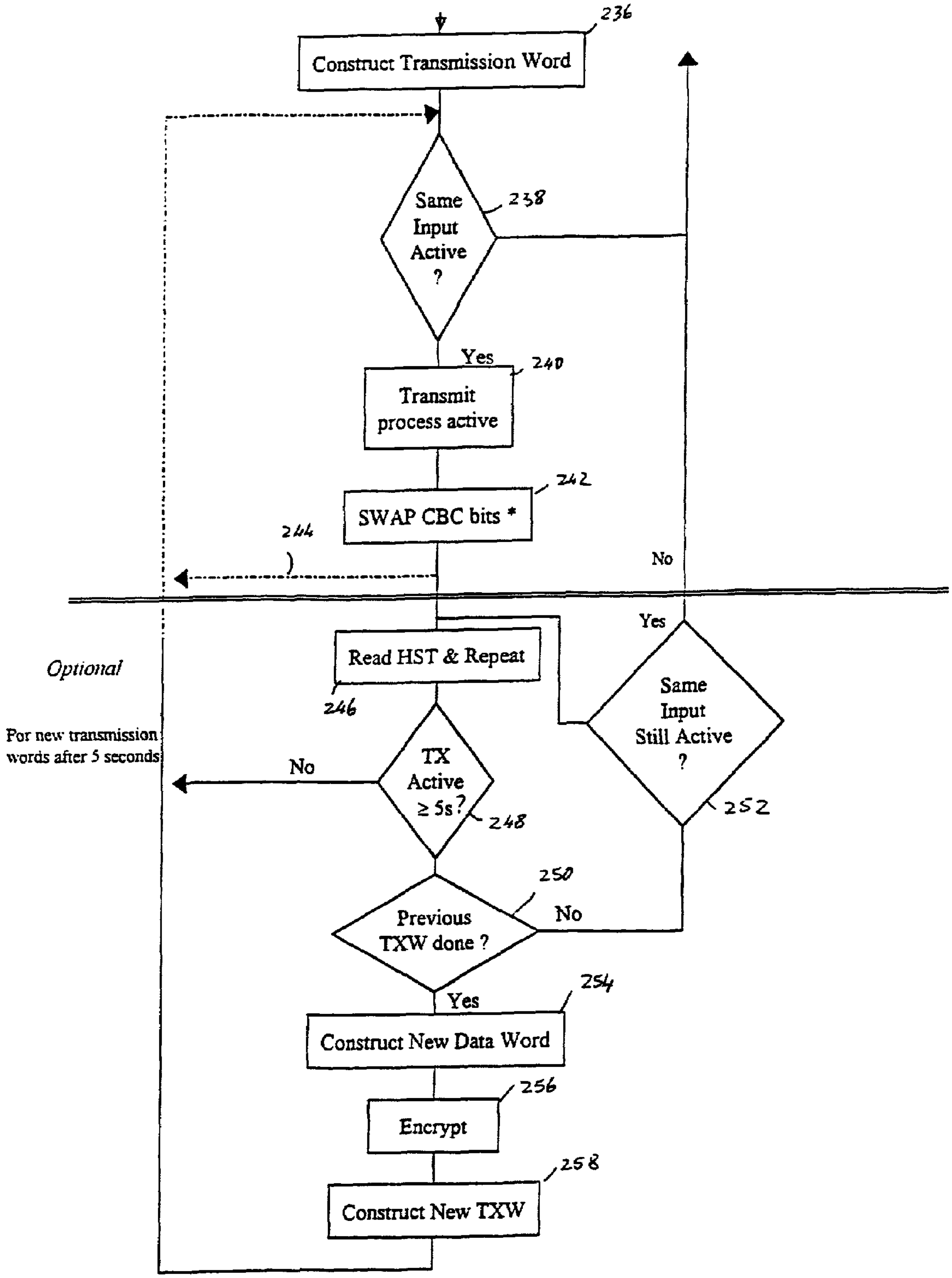
* with every word in a transmission that consists of a string of words, the CBC is partially transmitted Fig. 10a : Encrypt
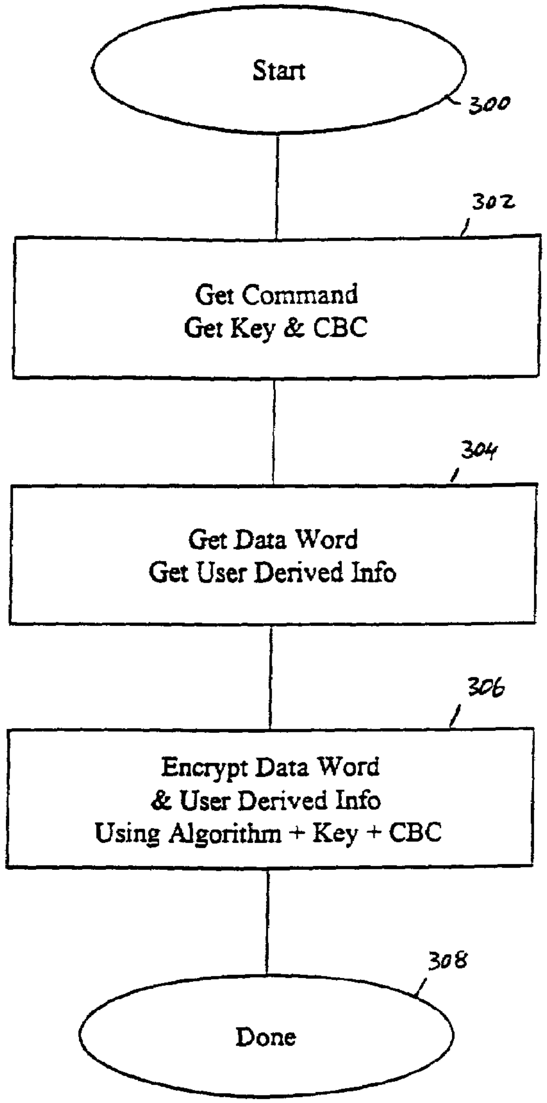
Fig 10b:
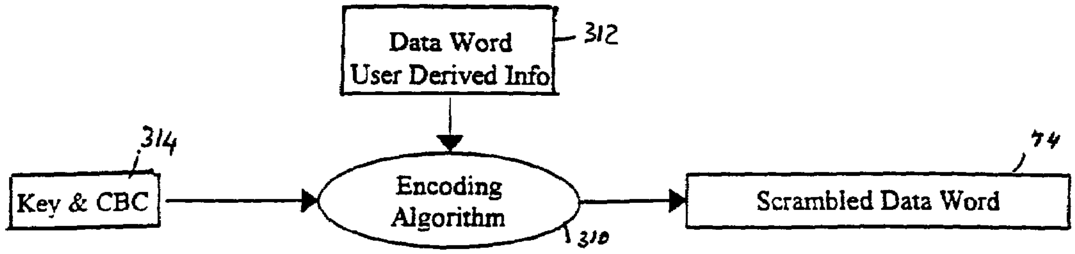

Fig. 11: Decoder : Normal Operation
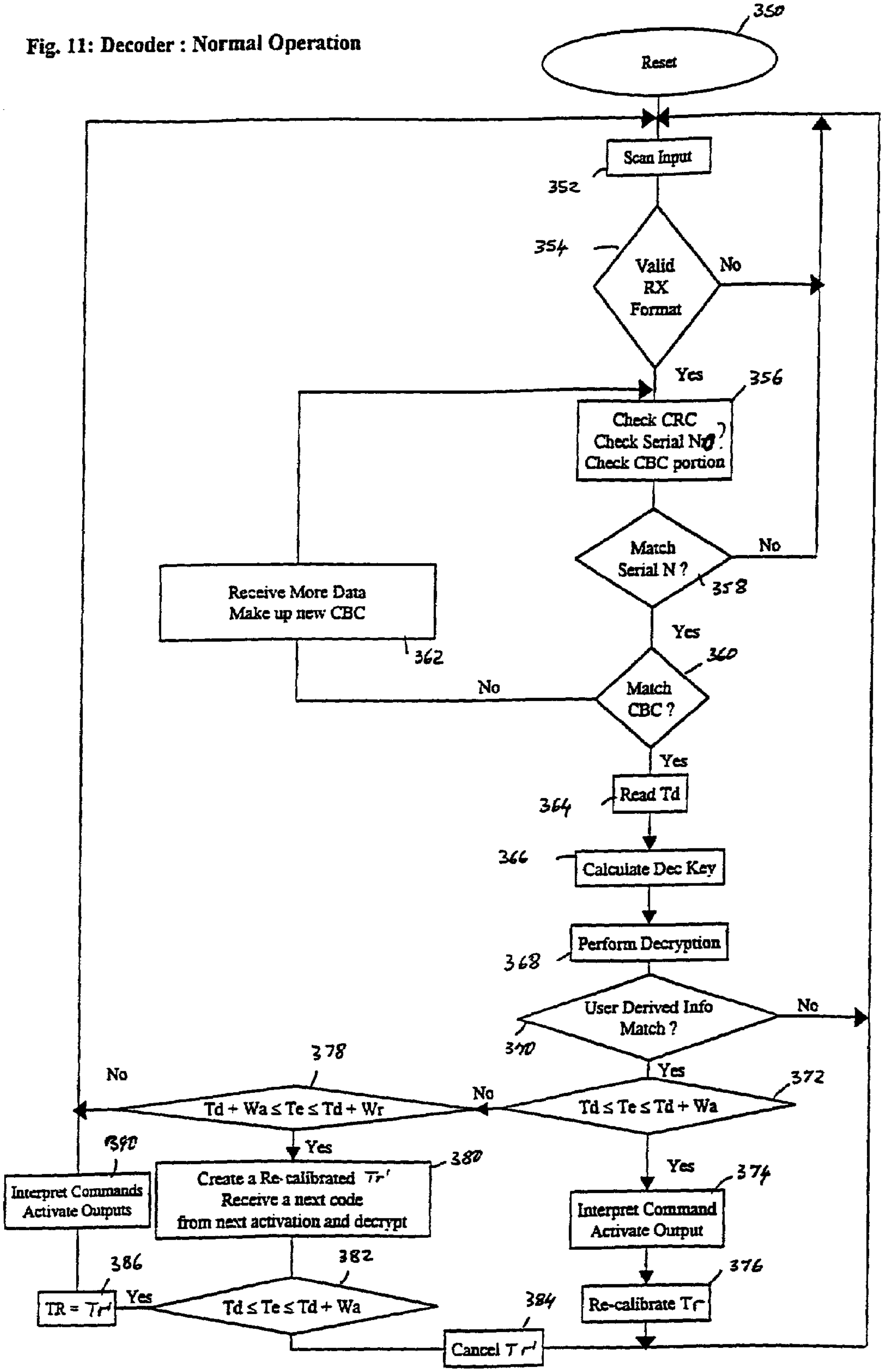

Fig. 12: Learn Operation: Decoder
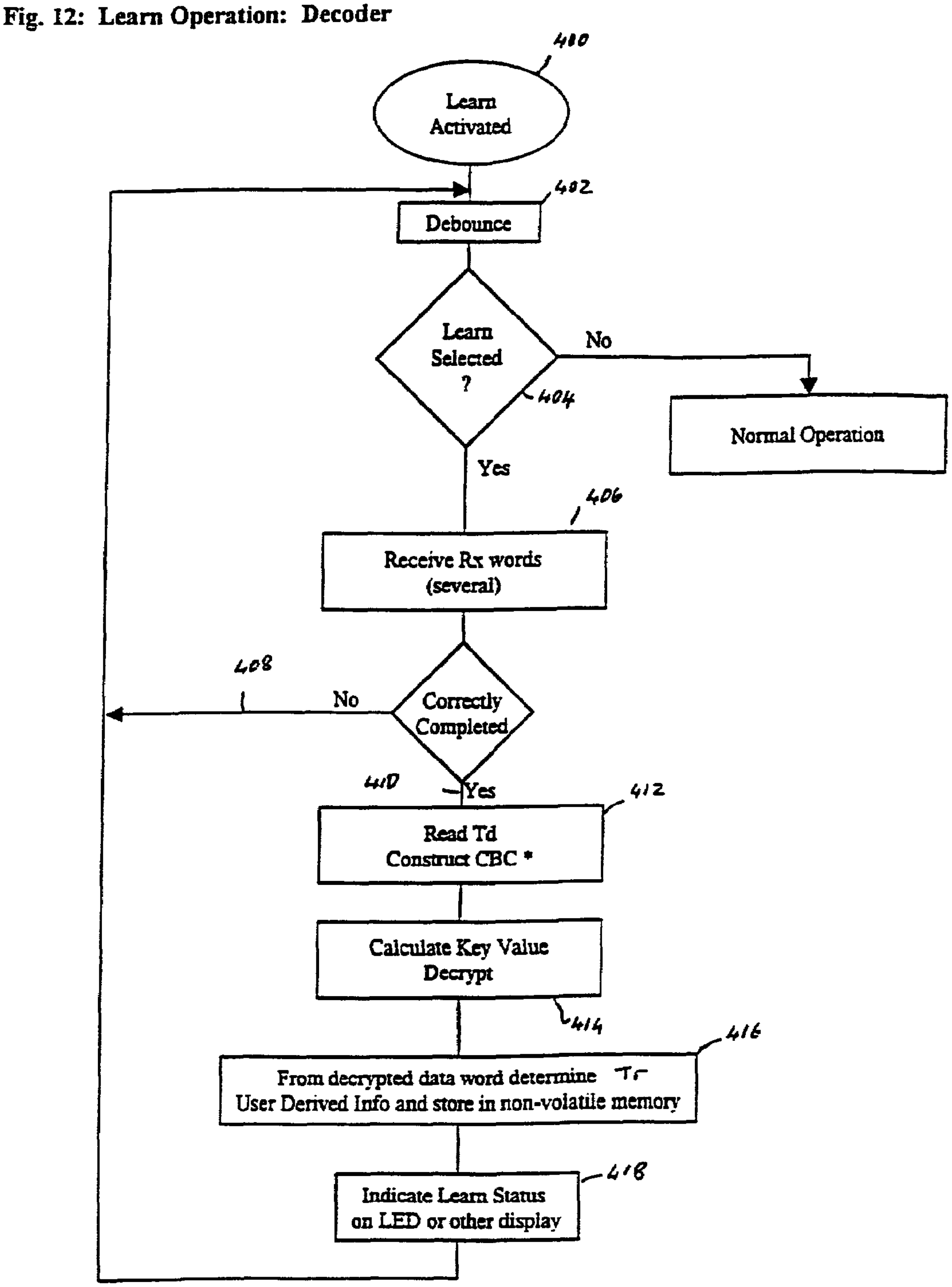
* Cold Boot Counter

Fig. 13: Encoder: Setting User Derived Information
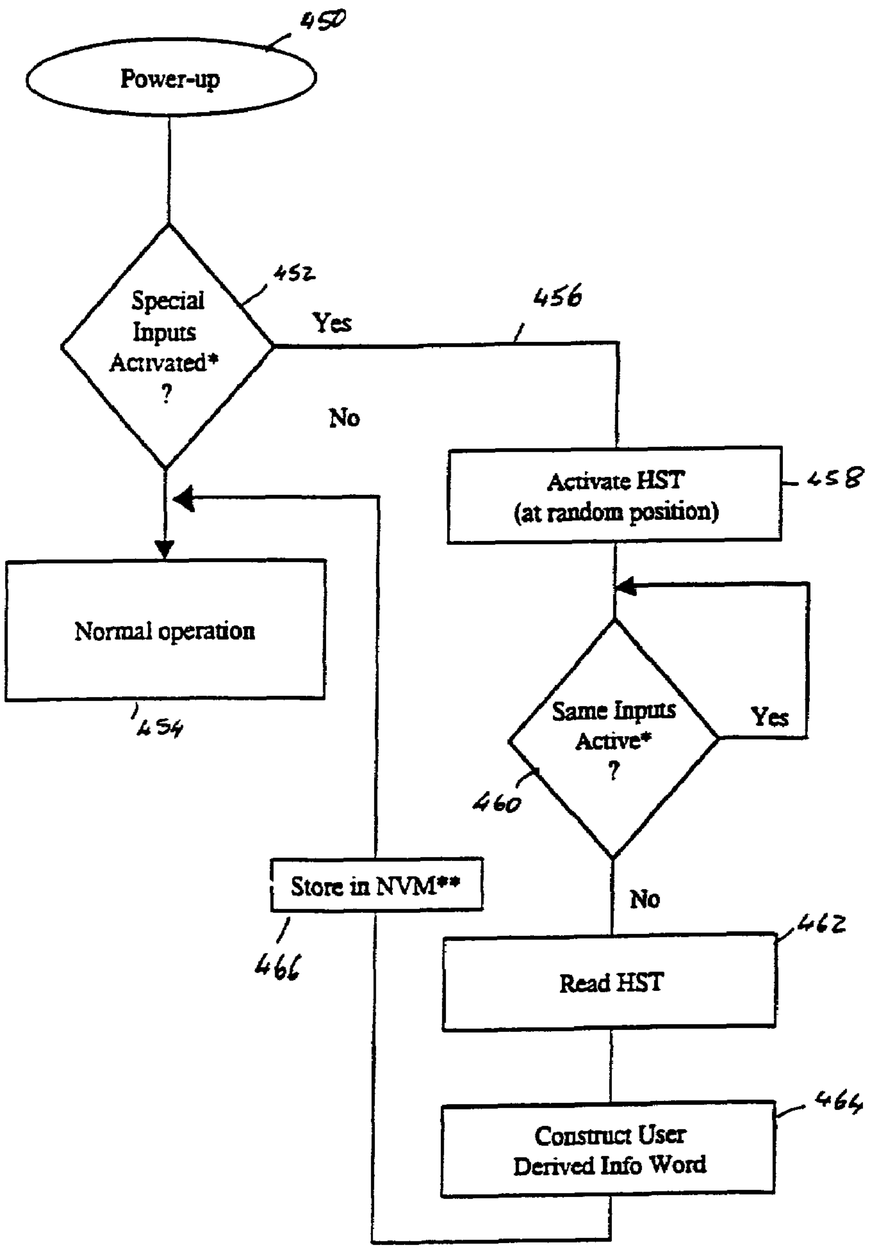
* To activate setting of User Derived Information
** NVM - Non-volatile Memory

METHOD OF AND APPARATUS FOR TRANSFERRING DATA

BACKGROUND OF THE INVENTION

This invention relates generally to the transferring of data in a secure manner using an electronic encoding and decoding system. The invention finds particular application to the remote keyless control of entry systems although it is not limited to this application which is described hereinafter merely by way of example.

Electronic encoding and decoding systems are being used to an increasing extent in access control and other security systems.

When applied to the opening of a garage or other door a remote control offers a user the convenience of not having to leave a vehicle in order to operate the door opener. Remote keyless entry utilised in a vehicle allows the user easy access to a vehicle without fitting a key into a keyhole. Remote control transmitters offer a convenient mechanism to activate and deactivate security systems like alarms and can act as mobile panic buttons.

The capability of an attack on a security system increases as the power and speed of commercially available computers advance and as these devices become cheaper. In other words security levels for access control are dynamic by nature and must from time to time be adjusted.

PRIOR ART

Early digitally based encoders and decoders were designed to transmit a fixed code of say 8 bits. The encoder (transmitter) would transmit the same code each time it was activated.

This type of system was attacked using a scanning device which includes a transmitter stepping through all of the codes sequentially. Since the number of possible codes was quite small, it was feasible to step through all the codes in a relatively short time. This type of scanning could be achieved by hand, using DIP-switches in an off-shelf transmitter.

To counter this problem the number of bits (code length) was increased and anti-scanning techniques were implemented. For example if a number of invalid codes were received in a short time period the system would freeze for a few minutes in order to make the time required to scan through the code space unacceptably long.

This solution was in turn defeated by code grabbers or recorders. The transmitted code was recorded and replayed. Irrespective of code length the receiver (decoder) was not able to distinguish between an original message and a recording thereof. A typical replay attack is impossible to prevent in a fixed code uni-directional system.

To overcome the code grabbing technique variable code, rolling code, or code hopping, systems were designed. These were all unidirectional systems because bi-directional systems were expensive and bulky. Although a number of these systems were relatively secure some had practical constraints and generally lacked an acceptable means of handling lost codes, ie. codes transmitted outside the range of the related receiver. This inevitably created a "backdoor" that resulted in a breach of security.

Soum (U.S. Pat. No. 5,107,258), Yoshizawa (European Application number 88116675.5) and Bruwer et al (U.S. Pat. No. 5,517,187) show systems addressing various problems associated with uni-directional security encoder/decoder systems. However, as has been pointed out, security systems are dynamic and new types of attacks have evolved and shortcomings in such systems have surfaced.

Soum's system has an incrementing counter and each transmission is based on a new counter value. The counter value together with other information is encrypted using an irreversible algorithm and secret information. The count is transmitted in clear text together with the encrypted data word. The receiver needs to verify that the encrypted value corresponds to an open value. As such a lost code or synchronisation does not present a problem.

In the system taught by Bruwer et al use is made of a counter that changes with each activation. Using a secret key or identification number the count value is encrypted together with other data by means of an algorithm that has a related decoding algorithm at the receiver. At the receiver end the encrypted code word is decrypted to yield the counter value. By subtracting the previous valid received code word counter value from the latest counter value the number of lost codes can be determined.

In the aforementioned references the number of lost codes can determine some further action but, more importantly, it can be ascertained whether the code received is indeed a new code and not a replay of an old code that could have been recorded.

The aforementioned systems do however display the following weaknesses irrespective of the quality of the encryption algorithm which is used to secure the data:

(a) off-site recorded replay attack: in this scenario the transmitter is activated out of range from the relevant receiver. The code is then recorded and can through a replay be used to activate (open) a garage door opener (GDO) or car door etc. This can be done even though the legal key is still with the owner and away from the receiver. Hours may pass since the recording was made. Of course, the next transmission from the authentic key received by the decoder will nullify the recorded code.

This attack can be more dangerous when, after the recording or recordings have been made, the legal key is damaged (not visibly but functionally) and therefore cannot nullify the recorded transmission by providing the receiver with a more recent code.

Unless the user erases that particular transmitter (or key), the attacker can use the recorded codes or codes for an extended period (months or years) to gain unauthorised access. It is known that the average user seldomly perform such tasks diligently.

The attack does need physical access to the legal key and it can be argued that the attack is irrelevant, which is probably true for most situations. However, it is still as easy as, or easier than, stealing a mechanical key, having a duplicate cut and then replacing the original to avoid suspicion;

(b) double recording, block and replay: this attack requires a little more skill but is certainly possible for most people with electronic knowledge. The attack is very relevant to single button GDO's. When a user activates a transmitter to close a door, the attacker records the transmitted code word but at the same time blocks the GDO receiver from receiving the particular code word. This can be done by selective jamming of the transmission words.

The user would typically attempt another transmission. The attacker again records and blocks. When the transmission terminates the attacker replays the first code word captured. The GDO receives this and closes.

If the user now leaves the attacker will have captured a code word that would for the time being (until the legal user returns some hours or days later) be capable of activating that particular GDO;

unsecured command bits: the system proposed by Soum transmits its commands unsecured. This would make it easy for an attacker to change one type of command (set alarm) into another (deactivate). Using this technique, the double recording block and replay attack can also be used on multi-button transmitter systems; and (d) fast stepping: wrapping in a short time. This is probably the worst problem since very little technology is required for this attack. The attacker steps the transmission by activating the transmitter a number of times, say 100, and then makes a few recordings of transmissions following. The attacker then activates the transmitter until it wraps around and stops it at the same count it was before it was originally started. The user is nothing the wiser but the attacker will have some future codes to use in an attack that may be at any time over the next extended period of time.

Non-security related shortcomings are:

(a) if a legal key is used for more than one decoder/application, the counter can be advanced many times between activation in the least used decoder. This can lead to wider window requirements which, although lowering the security level, is more of a practical operational problem.

(b) the fact that the counter value is transmitted in the clear as well, eg. as in Soum's technique, makes the code word longer. This has transmission energy and noise susceptibility implications.

As can be seen from the preceding discussion the systems presented by Bruwer et al and Soum, although vastly improved over previous fixed code systems, still have some areas open to improvement. This will become imperative as the technology available to attackers becomes more advanced. The incentive for an attacker also becomes more attractive as this type of system is used to protect more and more valuable property.

The system presented by Yoshizawa is time based with a timer replacing the incrementing counter used by Soum and Bruwer et al to ensure codes that change with every transmission. This approach holds major advantages for security. However, the system as presented by Yoshizawa has serious shortcomings when considered for wide ranging implementation in products like remote keyless entry (RKE) for vehicles, remote controls for gates and garage door openers (GDO's) or other access control applications with security requirements.

Yoshizawa proposes a system in which transmitter and receiver timers are started at the same time to synchronise the timers. This procedure would be too complicated for a large percentage of users. When more than one transmitter must operate a single receiver the position becomes much worse. In fact, when all transmitters are not present at the same time, this approach is impossible (col. 3—lines 36-41). This is impractical for most applications.

Yoshizawa recognises the time difference which will occur due to natural drift between the timers but only addresses this problem by increasing the window of time for accepting transmissions and giving a warning when the time difference reaches a certain limit which is less than the limit beyond which the receiver cannot be controlled.

In a further embodiment a code setting action is required (col. 5—lines 16-21). A wrist watch with a display and a keyboard (10-key) is shown in an example. In this embodiment the receiver can accept direct transmissions to set a number of timers. In this case keyboards on the transmitter and receiver are required.

The transmitter/receiver time displays also guide the user to adjust the time when a discrepancy is noticed. A system like this requires displays, keyboards and user intervention, and may be unacceptable in a large number of applications due to cost, size and user transparency ease-of-use requirements.

The Yoshizawa system is intended for applications in which a few "illegal entries", which may be achieved in a relative short period (col. 9—lines 45-48), are not regarded as a problem. However, in general security applications such an event would be unacceptable.

Yoshizawa does not present a solution for the very real problem where the receiver or transmitter timer loses power (dead battery) and as such loses track of time relative to other timers in the system. It must be deduced that a complete re-learn will have to be performed. This would certainly not be acceptable in the general marketplace.

SUMMARY OF THE INVENTION

The invention provides a method of securely transferring data from a transmitter to a receiver which includes the steps of:

(a) at the transmitter encrypting data which at least in part is based on timer information at the transmitter, to form a transmission word, (b) transmitting the transmission word to the receiver, (c) at the receiver decrypting the transmission word, (d) validating the transmission word by comparing the transmitted timer information to predetermined information at the receiver; and (e) when a valid transmission word is received adjusting the said predetermined information.

In one form of the invention the said predetermined information is a window size assigned to the receiver with reference to a previously received value and timer information at the transmitter is generated by a first timer which is operated to ensure that the timer information does not fall outside the said window.

In another form of the invention the said predetermined information is timer information generated at the receiver.

The data which is encrypted may be compiled into a data word which is encrypted to form the transmission word.

The data word may additionally include at least one of the following: identity information pertaining to the transmitter; command information; utility information; fixed code information; and user derived information.

The method may include the step of keeping the transmitter and receiver in synchronism using a cold boot counter which is changed each time the transmitter is powered up or comes out of reset. The count value of the cold boot counter may be used to influence a key or algorithm at the transmitter and the count value is not necessarily part of the data word which is encrypted.

The count value of the cold boot counter may be transmitted to the receiver in the clear.

At least part of a word in which the count value of the cold boot counter is embodied may be used to designate a possible optional status.

As each transmission word (ie. including the encoded or encrypted data word) transmitted from the transmitter is based on a new value from the timer at the transmitter, it follows that the transmission words may differ from each other even though the transmission words result from a single activation of the transmitter. This approach may however not always be desirable and according to a variation of the invention a new transmission word is formed only with every new activation of the transmitter or after an extended period of transmission activation.

According to a preferred aspect of the invention the encoder at the transmitter has a user-derived changeable portion of its key. This portion of the key can be varied through one or more inputs to the transmitter encoder made in any appropriate way, for example through the medium of DIP switches, a button operation procedure or the like. Added security is obtained since the user derived information cannot be known to the manufacturer.

According to a preferred aspect of the invention the receiver decoder has a learn mode which enables the decoder to learn a new authorised encoder. Upon completion of the learn action the decoder is able to recognise transmissions from the now-learned encoder. Since a key needs to be derived from data transferred from the encoder to the decoder during the learning process, for example from the serial number, seed, and user-derived key information, the method of the invention provides that this information may be stored and that the key may be derived only during the process of receiving and interpreting commands.

Preferably the method of the invention includes the step, during the phase that the decoder learns information from a transmitter, of storing the learning information in a first-in-first-out (FIFO) structure.

During the learning process a relationship is established between the timer value of the transmitter and the timer value of the receiver. The invention provides that the difference between the two timer values may be determined and stored at the receiver, updated when necessary, and the difference may be compared to the difference resulting with each subsequent transmission and updated when necessary.

In order to keep the timer (or clock) at the transmitter (encoder) in synchronism with the timer (or clock) at the receiver (decoder) the invention provides, according to a preferred aspect, that the encoder timer at its slowest variance (due to drift or any other factors) is faster than the decoder timer at its fastest variance (due to drift or other factors).

The invention may provide that with each valid reception of a transmission word the decoder recalibrates the relationship between the encoder and decoder timers for the specific encoder (referred to as the Tr value). In other words the previous Tr value is replaced by the latest Tr value which reflects the exact relationship between the timers of the specific encoder and the decoder.

According to a further aspect of the invention the method provides an auto-synchronisation window and a minimum or maximum window.

The auto-synchronisation window (Wa) sets a time limit boundary for drift which is not regarded as a problem. This window may be a fixed value but preferably is related to operating time of the transmitter and receiver and, consequently, will increase with the passage of time. The size of the window may be a function of the elapsed or operating time but, nonetheless, may be capped to an acceptable period.

If the encoder timer value lies outside a re-synchronisation window (Wr) then the method of the invention may inhibit the reception of further transmissions from the encoder and enforce a re-learn action to reset the encoder/decoder relationship. Alternatively the method may allow for at least one of the following steps in the case where the encoder timer is fast or the value of the encoder timer lies outside the Wa and Wr windows:

(a) resynchronise from an "open/safe" state. This is equivalent to adjusting the combination of a safe access code when it is open; or (b) the encoder may be brought into physical contact with the decoder by means of an electrical conductor or connector. This step may be required before further access can be granted.

By using a physical electrical connector to transfer resynchronising signals between the encoder and the decoder it is possible to allow the decoder to control activation buttons or inputs on the encoder to create a quasi bi-directional system. Activations can be executed in such a way that the probability of codes, which do not originate from the authentic encoder, being presented to the decoder, is very low.

For example by physically connecting the encoder to the decoder it is possible to activate the encoder at a precise period and start the timer at the encoder. The decoder then randomly activates other inputs at the encoder which influence the transmission words from the encoder by using command bits in the data word. The decoder verifies that the words were constructed at the precise time with the correct command input information. By ensuring that the activation sequence is such that the encoder timer is used the pre-recording of multiple commands can be prevented thus lowering the probability of a successful attack.

In a specific embodiment a timer based transmitter (or key) can be designed to work with both non-timer and timer based decoders (receivers). This is important in a situation wherein a dual system may be required for a move in technology from counter-based to timer-based techniques but where compatibility with existing systems in the field is essential.

The timer in a transmitter may count normally upon activation when batteries are inserted. When the transmitter is "learnt" to a receiver, the decoder accepts any value. That is, the decoder does not distinguish between a counter or a timer but simply accepts a value. This alleviates any requirement for starting the systems together as per the prior art.

The transmitter will then keep the timer active only for a period which would keep the timer value within the automatic re-synchronisation window of the old count (on button activation) based system.

When the timer reaches the point at which the timer value will go out of the window, the timer stops. This means that upon the next transmitter activation the timer value used, will be viewed by the "old" decoder as a counter that is still within the limits of the auto re-synchronisation window and will be accepted without a problem.

In another embodiment the transmitter will set a flag when its timer moves outside the auto re-synchronisation window. Upon the next transmission the transmitter will automatically perform the actions required for re-synchronisation when the counter is outside the window, for example doing two transmissions with timer values in close proximity of each other.

In order to handle situations wherein battery (power) failures occur, the timer value can be stored in non-volatile memory every time a transmission occurs. Upon reset the stored value will be used as a basis for the restart.

Preferably, in step (e), the said predetermined information is adjusted to compensate for drift between the transmitter timer and the receiver timer or for any other discrepancy or variation at the receiver.

The invention also provides apparatus for transferring data which includes a transmitter and a receiver and wherein the transmitter includes a timer and an encryption unit for encrypting data which at least in part is based on timer information from the transmitter timer thereby to form a transmission word, and the receiver includes a receiver timer, a receiver unit for receiving the encrypted transmission word, a decryption unit for decrypting the received transmission word to extract, at least, the said timer information from the transmitter, and a comparator unit for comparing decrypted transmitter timer information to timer information from the receiver timer to determine the validity of the transmission word. The apparatus preferably includes a unit for adjusting the receiver timer information when a valid transmission word is received.

The invention also extends to a transmitter which includes a timer and an encryption unit for encrypting data which at least in part is based on timer information from the transmitter timer thereby to form a transmission word and wherein the timer is permitted to run only for a limited period after each activation of the transmitter.

The invention also provides a transmitter which includes a timer and an encryption unit for encrypting data which at least in part is based on timer information from the transmitter timer thereby to form a transmission word and wherein, when the timer runs beyond a predetermined limit, the transmitter, upon activation, transmits more than one transmission value.

BRIEF DESCRIPTION OF THE DRAWINGS

The invention is further described by way of examples with reference to the accompanying drawings in which:

FIG. 1 is a block diagram representation of an encoder used in a data transferring system according to the invention, FIG. 2 is a memory map of the encoder shown in FIG. 1, FIG. 3 is a block diagram representation of a decoder for use with the encoder of FIG. 1, FIG. 4 is a non-volatile memory map of the decoder of FIG. 3, FIG. 4*a* is a volatile memory map of the decoder of FIG. 3, FIGS. 5 and 6 respectively represent data and transmission words originating at the transmitter, FIG. 7 depicts memory locations for a learning encoder, FIG. 8 illustrates a first-in-first-out technique for learning a second encoder, FIG. 9 (which is presented in two parts marked FIG. 9*a* and FIG. 9*b* respectively) is a flow diagram representation illustrating normal operation of the encoder, FIG. 10*a* is a flow diagram of an encryption process, FIG. 10*b* illustrates the action of an encoding algorithm, FIG. 11 is a flow diagram of steps during normal operation of a decoder, FIG. 12 is a flow diagram representation of a learn operation at the decoder, and FIG. 13 illustrates the setting of used derived information at the encoder.

DESCRIPTION OF PREFERRED EMBODIMENT

FIG. 1 is a block diagram representation of an encoder 10 which is used in a transmitter for transmitting data, in a secure form, according to the invention, over a radio frequency, infrared, or other medium.

The encoder can be implemented as an integrated circuit with its various components being part of this circuit or provided as discrete components.

The encoder 10 has non-volatile memory 12, a control unit or processor 14, an interface or input module 16 which receives data from input sources 18 such as switches or push buttons, an oscillator 20, a timer 22 and a voltage reference module 24.

Information pertaining to the identity of the encoder is stored in the non-volatile memory 12.

The timer 22 runs continuously and is connected to the oscillator 20, or to a crystal, to give a timing reference. The timer 22 changes at regular intervals to reflect time irrespective of whether the encoder is activated for transmission. The time measure can be in minutes or seconds but may be any regular period.

The encoder is controlled by a user activating one or more of the inputs 18 and the resulting signals are interfaced to the control module 14 which interprets the input and causes corresponding operation of the encoder.

FIG. 5 illustrates an example of a data word 28 produced in the encoder. In this example the data word includes timer information 30 derived from the timer 22, command information 32 which is produced by one or more of the inputs 18, a serial number 34, or a portion thereof, which relates to the identity of the encoder, fixed code or user derived information 36, and utility information 38 which pertains to operational parameters of the encoder. The timer information 30 is essential to produce variance in the data word 28 in order to prevent replay attacks. The length of the timer and its resolution reflect a balance between cost, security, and practical implementation factors. For example the timer may be a 24-bit device which increments every 10 seconds. Due to the fact that the timer changes every 10 seconds a transmission value recorded away from the receiver will soon be invalid because the decoder will be able to determine that the timer value is out of date.

The oscillator 20 in FIG. 1 is preferably completely on-chip failing which the oscillating range must be restricted. As such the oscillator cannot be fast forwarded to achieve the same effect as in a “fast stepping” attack, or purely to make up time that can be used to record away from the receiver and then use the “extra” time to go back to the receiver.

One of the major problems of a time based system is that power 40 (see FIG. 1), whether from a battery source or otherwise, may be lost. If this happens the encoder immediately loses its relative time compared to other encoders and decoders which form part of the security system in question. The time may be saved into non-volatile memory at regular intervals so that upon re-application of power to the encoder the timer can proceed from where it left off. It will, however, still be out of synchronisation by approximately the period that it was without power.

Continuously writing to memory requires “waking up” at regular intervals and over several years of usage the writing may be extensive. The waking up and writing operations consume meaningful quantities of energy which is not desirable in most applications. These operations may also limit the options on non-volatile memory due to the high number of read/write cycles and thus the quality of non-volatile memory which is required.

Another option is to save the time with each transmission. Neither of these possibilities is however without drawbacks from the security point of view. The invention, as an alternative to the aforegoing approaches, makes use of a cold boot counter (CBC) 46 as is shown in the memory map 48 of FIG. 2. The cold boot counter value is incremented or changed each time the encoder is powered up or comes out of reset. The cold boot counter can also be changed when the timer overflows after an extended period of operation.

The use of the cold boot counter holds several advantages in practice:

(a) the encoder is generally cheaper. Incrementing the timer in volatile memory (RAM) at lower voltages is less costly than storing a value in non-volatile memory (EEPROM) at very low voltages;

(b) fewer writes to non-volatile memory are required;

(c) the risk of writing errors is reduced;

(d) since the cold boot counter is changed only at the time of powering up or reset, time constraints are much relaxed. It may however be desirable from a security perspective to increase the time constraints from seconds to minutes; and (e) the power requirement is reduced.

It is noted that it is important that the cold boot counter value changes in a constant direction (up or down) in order to determine new and old transmissions (possible replays).

As is shown in FIG. 2 the memory map 48 at the encoder includes an identification number or key 50, the cold boot counter (CBC) value 46, a serial number 52, a configuration word 54, a seed 56 and user-derived key information 58. The cold boot counter value can be used to influence the key or the algorithm at the encoder and does not necessarily form part of the data word 28 to be encrypted. It is however proposed that the cold boot counter value is transmitted to the receiver/decoder in the clear. This may not happen with every word but can for example only occur in an extended transmission, say of at least 15 seconds, or for the first hour after a power-up event. The CBC value may also be transmitted partially with successive transmission words.

FIG. 6 illustrates a transmission word 70 which includes the cold boot counter value 46 (in the clear), command information 72, an encrypted version 74 of the data word 28, the serial number 34, a heading 74 and a cylic redundancy count (CRC) value 78. This word is transmitted to the decoder at which the word is decrypted and data extracted therefrom is used, in a manner which is described hereinafter.

According to one aspect of the invention a number of high end bits of the timer value are used for a high speed timer to count down for a short time period, say of the order of 10 seconds. This is done immediately following a first transmission in a sequence of activations. One bit of the timer is used to designate an optional status bit to show what is reflected in the timer 22. This high speed timer allows easy access and better time resolution in the period after a transmission has been activated and helps a decoder make time-based activation decisions. For example a second transmission activation within three seconds of a first activation may be a command to unlock all doors in a vehicle and not only the driver's door. The decoder need not even receive the first transmission.

As the timer 22 runs each transmission word from a single activation of the encoder may be based on the new timer value and may as such differ from a preceding word. This approach may however not always be desirable and according to a variation of the invention a new transmission word may be formed with every new activation of the encoder or after an extended period of transmission activation, say in excess of 5 seconds.

FIG. 3 is a block diagram representation of a decoder 80. The decoder includes a control unit or processor 82, an on-board oscillator 84, a timer 86, a decoding and key-generating algorithm 88 which is stored in non-volatile memory, a memory module 90, a reset and voltage reference 92, and an output module 94 which acts as an interface to output devices 96 eg. LED's or the like. Data 98 may be transmitted to the control unit during a normal transmission whereas learning input 100 may be instructed to the control unit to enter a learning mode. Preferably the oscillator is controlled by a crystal 102.

FIG. 4 is a decoder memory map 104 of information held in the non-volatile memory 90. The map includes a generation key 106 and a plurality of sets of data 108(1), 108(2) . . . etc. resulting from successive transmissions from respective transmitters/encoders. Each transmission includes the respective cold boot counter value, the seed and serial number, the user identification number and the configuration word referred to in connection with FIG. 2. The decoder, in volatile memory, (FIG. 4(*a*)), may also include information about the relationship of each encoder timer with the decoder timer (Tr).

Learning

The decoder 80 has a learn mode in which it can "learn" a new authorised encoder. Upon completion of the learn action the decoder is able to recognise transmissions from the now learned encoder. The learning process is, in general terms, known in the art. However it is proposed that each encoder has a user-derived changeable portion of its key 58 (see FIG. 2), which is a portion of the key that can be changed or influenced by the user and which is not known to the manufacturer. This has a number of security benefits. The user-derived key information can be determined through inputs 18 to the encoder, eg. DIP switches or through a button operation procedure. An example is the time period between a first power-up action and the instance at which a button is pressed. The user-derived information 36 may also be inserted into the data word 28 and both methods will cause a change in the transmission word (70) values and sequence.

Since a key needs to be derived from data transferred from the encoder to the decoder during the learning process (for example the serial number, seed and the user-derived key information) it falls within the scope of the invention to store this information and to derive the key only during the process of receiving and interpreting commands. This does have the drawback of needing extra processing at the time of receiving a command but saves costs as non-volatile memory to store the keys is not required. When learning information from a transmitter, during the learn mode, this information is stored in a first-in-first-out (FIFO) stack structure.

As can be seen from FIGS. 7 and 8 each new encoder is learned into the same position. Prior thereto all other positions have been programmed into the next memory location, overwriting the information that was there before. Clearly the previous value that was in position "n" (FIG. 8) will be lost—hence the FIFO designation.

During the learning process a relationship (Tr) is established between the timer value (Te) of the encoder and the timer value (Td) of the decoder.

For example, if at the time of learning, Te=120 and Td=1243, the mathematical difference, Tr, between the two values, which is 1123, can be stored. If it is accepted that the decoder and encoder timers are perfectly in synchronism then at the time of the next transmission when Td=1574 the received Te value must correspond to mathematical difference of 1574−1123=451. It is important that the Tr value is stored for each learned encoder.

Synchronisation

As the encoder and decoder timers (22 and 86 respectively) will inevitably exhibit drift between them in all but the most expensive systems it is important to accommodate such drift without undue sacrifices to security and with as little requirement for user intervention as possible. This also holds true for the handling of a power failure at the encoder or decoder.

According to a preferred aspect of the invention the timers 22 and 86 are designed so that the encoder timer is always faster than the decoder timer. The design is such that even with the encoder timer at its slowest variance and the decoder timer at its fastest variance the encoder timer is the faster of the two.

With each valid reception the decoder recalibrates the Tr value for the specific encoder and the previous Tr value is replaced with the new Tr value which reflects the exact and latest relationship between the encoder and decoder timers (22 and 86). As such even if there is drift of (say) 1 minute per day and a 5 minute window is allowed for a valid transmission, a system which is used on a regular basis does not drift too far because with each use the previous drift is calibrated out. For example, a system in a car which is used twice a day (evenly spaced) will, based on the preceding assumptions, always be within about 0.5 minutes accuracy.

Due to security considerations a reception under conditions in which Te is further advanced, with reference to Td, is less of a problem than a slow Te. The latter may be an attempted replay or a transmission recorded out of range from the decoder and then taken to the decoder (hence the timer loss) and replayed.

Production offsets (ie. drift between the timers which is constant and which does not change over time) can also be calibrated out with a coefficient. For example when an alarm system is installed in a controlled environment (regulated temperature and voltage), two transmissions with a reasonable time period between them (of the order of several minutes) can be used to trim out such manufacturing offsets. If it is known that under controlled voltage and temperature conditions the normal drift is 1%, but it is found by measuring the drift between two successive transmissions that the drift is in fact 2%, then the difference can in future always be multiplied by a factor (101/102). If the drift on the other hand is −1% then a factor (101/99) is used to adjust the drift.

The invention allows two types of forward windows to be accommodated, namely an auto-synchronisation window Wa and a re-synchronisation window Wr.

The auto-synchronisation window sets a time limit boundary for drift (Te greater than Td) which is not regarded as a problem. Security requirements dictate this value should be as small as possible but, from a practical point of view, this should not enforce additional actions on a user to such an extent that the system becomes cumbersome or user-unacceptable. The auto-synchronisation window could be a fixed value but in a preferred embodiment is represented by a factor of, say, 3% of usage time. In the latter case the window grows larger over time but is a more accurate representation of the drift between the counters. In the prior art which is embodied in Bruwer et al and Soum the counters represented a number of activations which are unrelated in time. In the present invention however the auto-synchronisation window is not related to the number of activations and is purely a function of the relative drift between the timers over the time elapsed since a previous valid reception. This is the case since Tr was last calibrated at the minimum or at the time of the previous valid reception. Note that in Yoshizawa the window has to cover time elapsed since the encoder was first connected with the decoder. This is quite a severe impediment.

The Wa type of window which can be accommodated by the system can have a minimum and/or maximum value. This window can be specified even though a factor of the elapsed time is used for the determination of the window size. This has the advantage that in a system which is used on a regular basis the Wa window is quite small but even if the system is not used for a long time, say in excess of a year, the size of the window Wa is kept to an acceptable period of, say, 10 minutes.

For example for a 0.1% Wa factor and 5 second minimum and 10 minute maximum caps the following occur:

| Time since previous valid code | Wa size |
|---|---|
| 10 minutes | 5 seconds |
| 5 hours (600 min) | 36 seconds |
| 5 days | 7.2 minutes |
| 10 days | 10 minutes |
| 1 year | 10 minutes |

Should the Te value be faster so that it falls beyond Wa in terms of security it is desirable to perform further security checks. A further window called a re-synchronisation window (Wr) can be used and this window will require some further security checks that may not be too stringent.

One such security check requires a further transmission in order to verify that the timing information correlates with the expected value with reference to that of the previous transmission which fell outside Wa but inside Wr. In some applications this check would suffice and, if the encoder timing information passes this test, the decoder accepts the command and also re-synchronises the Tr value to remove the drift which has occurred.

If the Te value is beyond Wr the decoder does not accept transmissions from that encoder and enforces a re-learn or other action as is described hereinafter, which totally resets the encoder/decoder relationship.

With a Te value which is slow with reference to the Td value the security constraints required are much tighter. With correct design there is no reason why the Te value should fall behind the expected value. It must be recognised however that any increment beyond the value previously received, even if slower with respect to the expected value, still yields better security than "activation count" based systems such as those described in the Bruwer et al and Soum. Yoshizawa on the other hand treats slow and fast windows in the same way.

Depending on the security requirements various options can be designed into the system to "double check" the authenticity of the encoder. For example, if the Te value is 30 seconds fast then the decoder can check for a new value 30 seconds later. A valid new code would mean that the encoder is present and therefore authentic.

However with a sound design and a guarantee that Te is faster than Td, rather than slower, the reception of a slow Te raises serious security concerns.

It is possible to re-synchronise an encoder with a slow Te, or a Te falling outside the Wa and Wr windows, in one of three different ways described hereinafter:

(A) Re-Synchronise from an "Open/Safe" State.

This is equivalent to adjusting the combination of a safe access code when it is open. As such another legal or approved mechanism must be used to put the system in an "open" state. This can be another encoder, a mechanical key, an electronic token or the like. Once in an "open" mode the Tr value can automatically adjust.

(B) Physical Contact between the Encoder and Decoder can be Established by Means of an Electric Connector.

This can be a requirement before further access is granted. Physical contact may be established through an electrical connector situated on the outside of a security perimeter which is protected by an access control system linked to the encoder/decoder.

For example if the system controls a garage door opener, the electrical connector can be in a house or an outer side of the house. On the other hand if the security system is used in connection with a vehicle, the connector may be on an outer side of the vehicle or some place which is accessible only with a mechanical key, eg. inside the trunk or boot of the vehicle.

By using a physical electrical connector to transfer electrical signals the decoder can control activation buttons to create a quasi bi-directional system. Electrical contacts to the activation inputs of the encoder allow the activations to be executed in such a way that the probability of codes, which do not originate from the authentic encoder, being presented to the decoder is very low. This probability can be statistically controlled by suitable design. In other words by making the communication via the electrical contacts more complex or expanded, the probability of a successful attack can be lowered.

In a preferred embodiment the high speed timer and repeat (activation) counter play a major role. Upon insertion in the connector the decoder activates the encoder. This first transmission starts the high speed timer and the decoder then randomly activates other buttons which influence the transmission words from the encoder via the command bits in the data word. The decoder verifies that the words have been constructed at the precise time with the correct command button information. By making sure the activation sequence is such that the high speed timer is used or that the normal timer would show, the pre-recording of multiple commands can be prevented, thereby lowering the probability of a successful attack.

In another embodiment the sequence can also be checked via the repeat activation counter which counts the number of activations in a defined period after a first activation. Again, this can prevent the pre-recording of multiple activations in order to have a replay response available to the decoder activations.

The same mechanism can be used via feed back to a user but will probably not be acceptable for the average user. An example is a display panel indicating the sequence of buttons that must be pressed.

(C) Bi-Directional Communication.

Full bi-directional communications may be used. If however bi-directional communication facilities are available then these facilities should be considered for more extensive use as they can enhance security when implemented correctly. A situation can however be foreseen in which communication in one direction will be of limited range. For example, the encoder to decoder medium may be RF whilst the decoder communicates with the encoder via optical, transponder or hard wiring means due to cost or other considerations.

In an example of an application using the principles of the invention an IR LED may be used to provide the communication medium from the decoder to the encoder. The encoder is part of a RF key fob. The encoder monitors an optical receiver (PIN diode) after it has been activated and has transmitted a code word. If the decoder receives a code from the encoder with an unacceptable Te, it communicates back to the encoder via the optical medium. If the key fob is held in the optical path, (because the user notices that the decoder does not read), it will receive the decoder data and the encoder/decoder can proceed with a bi-directional verification process.

It must be mentioned that a physical connector can also solve the problem of a dead encoder battery by providing power, whereas the optical system cannot.

If the authenticity of the encoder is established via any of these methods, the Tr value is automatically adjusted to resynchronise Te and Td by removing any drift that may have caused the problem.

Encoder Operation

An example of an encoder operational life cycle is described with reference to FIG. 9.

Upon a power-up sequence or when a reset occurs (210) a number of functions take place to reset the integrated circuit which embodies the encoder. In essence the integrated circuit is put into a well-defined state to ensure that its function is predetermined upon coming out of reset. For example memories are cleared, and pointers and program counters are set to defined positions.

The encoder now increments (212) the cold boot counter (CBC) value. It is important that redundancy or error correction is used in this step to prevent the CBC value from being erased or scrambled due to writing errors or the like. As such checks should also be done to verify that the voltage supplied to the circuit is sufficient to ensure successful writing into the non-volatile memory.

Once the CBC value has been incremented the encoder moves into the cycle in which it will spend most of its life. If the timer is to be incremented (216), and this takes place at regular intervals of, say, 10 seconds, then the timer count is advanced (218). A further check (220) is done to verify that the timer has not reached its limit and is about to overflow. This however is a rare occurrence.

The inputs 18 (see FIG. 1) are monitored (222) to check if the encoder has been activated. If no inputs are active the cycle repeats itself endlessly.

Upon detecting active inputs, the inputs are debounced and read (224). If the inputs are valid (226) the timer value is read and the data word is constructed (228). It has been explained in connection with FIG. 5 that the data word consist of several elements which are put together to prepare the encrypted data word 74 (see FIG. 6).

If the inputs are not valid (229) then the earlier cycle steps are repeated.

After reading the timer the controller checks if the high speed timer (HST) is already running or if this transmission is actually the first transmission which has taken place after a period of inactivity (230). If the HST is not running it is started and the flag for the HST is set so that it is recognised that the HST is active (232). The subsequent transmissions will include the high speed timer count as part of the data word.

The resulting data word is encrypted (234) and the result is used in the construction of the transmission word 70 (see FIG. 6) in a step 236 (see FIG. 9*b*). Before the transmission word is transmitted over the medium in question (RF, IR or other) the inputs 18 are checked to verify that the same command is still active (238). If not the transmission is abandoned and the controller 14 returns to its waiting cycle (216, 222).

If the command is still active the encoder starts to output the data of the transmission word so that it can be transmitted (240). Typically the encoder is responsible for the data rates. Although not shown the encoder can continuously check for a new input demanding that a new word should be formed immediately. Under such circumstances the transmission can immediately be terminated in order to start preparing and transmitting the new transmission word.

The controller can exchange some of the CBC bits that form part of the transmission word (242). For example if the CBC is 16 bits and only two bits at a time are being added to a transmission word then 8 consecutive words would be required to reconstruct the CBC counter at the receiver/decoder. This does not affect the security of the transmission but it does provide a convenient way of reducing the length of the transmission word.

Thereafter the controller can return the operation (244) to the phase prior to the step 238. If however the system is designed to start output of the HST after a certain elapsed time (say 5 seconds) it proceeds to a step 246 at which the HST count is read. A check is then performed to see if the command currently active has been active for at least 5 seconds (248). If a transmission word has not been previously constructed (250) then a check is done (252) to see if the same input 18 is still active. A recycle or return to earlier process steps takes place depending on the outcome of this test.

If a transmission word has previously been constructed then the process synchronises the addition of a new HST count with the completion of an earlier transmission and a new data word is formed (254) and encrypted (256), and a new transmission word is constructed (258). The transmitter cycle then continues from immediately prior to step 238. At any time the process can be terminated when the inputs change or fall away (238 or 252).

If the inputs change or are repeated within a short period, say from the start of the HST, the repeat counter increments with each new activation. Once the HST overflows the normal timer is incremented. If the HST works within the same interval (say 10 seconds) this should prevent seamless timing.

Encoding

An encoding example is described with reference to FIGS. 10*a* and 10*b*. At the start of an encryption algorithm (300) all the initialisation of hardware and software is done. A specific key is read from non-volatile memory and the CBC count is obtained (302). The key is the key allocated to a specific encoder. If an encoder has multiple keys one of these is determined by means of a particular command. The key may be read 8 bits at a time. The data which is to be used in the encrypted data word, ie. the data word and the user derived information, is obtained (304) and the various elements are fed to the algorithm (306) to yield a scrambled data word (308) which is used in the transmission word.

FIG. 10*b* schematically depicts an encoding algorithm 310 operating on the data word and user derived information 312, and the key and the CBC count 314, to yield the scrambled data word 74.

It is to be noted that in the decoding process which is carried out at the receiver the decoder algorithm performs the reverse operation in that if the decoding algorithm is provided with the correct key and CBC count the decoding algorithm transforms the scrambled data word 74 to yield the data word and the user derived information.

An example of decoder operation is discussed with reference to FIG. 11.

Upon reset (350) the decoder, in a step (352), scan its input (98 in FIG. 3) for data received. If a test 354 shows that the data format is incorrect then the preceding cycle is repeated. Once a complete transmission word of the correct format has been received the decoder, in a step 356, does a cyclical redundancy check (CRC) to verify that the transmission word was correctly received, and checks the serial number and the CBC portion of the transmission word. Thereafter in steps 358 and 360 respectively the serial number and the CBC value are matched against corresponding values stored in non-volatile memory 90 (see FIG. 3).

If the CBC value is not matched against the stored value then a period of time elapses in which additional data is received and a new CBC value is constructed (step 362). The validation process is then repeated.

After the validation process has successfully been completed the decoder reads the timer data Td (step 364) and then uses the serial number and other information stored during a learning process to calculate a decryption key (366) corresponding to the encoder that generated the particular transmission word.

The decoder uses the decryption key together with the CBC value to perform a decryption process (368) on the scrambled part of the transmission word. It is to be noted that some commands may not require any security and in this event the decoder may interpret and activate the command after the step 360. However, since the only advantage would be that the command can be issued some milliseconds earlier this is not of particular significance.

With the decrypted data word available the decoder performs a check to verify a match between the encoder user derived information and the decoder user derived information (370). A non-match forces a return to the scanning of the input for a valid transmission word (step 352).

If the match is positive the more complex checking between the encoder and decoder timers is performed. In this example a re-learn is assumed if the re-synchronisation window Wr is exceeded or Te lags behind Td. Firstly the automatic synchronisation window is checked (372) and if the check is passed then the command bits are interpreted and the outputs activated (374). The Tr value is updated to reflect the latest relationship between the encoder and decoder timers (376) and thereafter the process is repeated.

If the step 372 shows that the difference between the encoder and decoder timers displays a Tr value falling outside the auto-synchronisation window Wa then the value is checked against the less rigid re-synchronisation window Wr (step 378). If Tr also falls outside of Wr then the received transmission word is abandoned as being invalid and the decoder returns to the scanning input step 352.

If the timing difference Tr falls within Wr then the decoder prepares to receive another transmission word within a short time (say 10 or 20 seconds) and it then can use the HST data to confirm a second transmission (380) and verify the timing relationship (382). Because the time interval in question is particularly short no significant drift can occur. A check is done against Wa but, if necessary, a tighter check can be effected. If the test fails the decoder cancels the re-synchronisation process (384) and returns to step 352.

If the timer test (382) is successful the Tr value is adjusted (386) and the commands are interpreted and activated (390) whereafter the process returns to the stage 352.

The preceding example does not cover the handling of the HST, repeat data, battery level indication, shift levels nor a situation in which the decoder loses or has lost power and therefore has lost timer information.

Usually the decoder is more expensive and complex than the encoder. A single decoder is also typically required to work with multiple encoders. Power consumption is normally less constrained at the decoder, compared to the encoder. Due to these factors it is desirable to have the decoder timer include the HST portion permanently. This may prove handy for comparisons at re-synchronisation actions or when second or third instructions are received within a short space of time. It is also important for handling a quasi-bidirectional synchronisation or authentication process as discussed earlier.

The shift levels, battery level indications and repeat values all comprise information which may influence the outputs generated by the decoder.

If the decoder should lose power then it would pass through the reset state (350) when power is restored. At this point a choice is made from a number of options. For example the time of every valid reception can be stored in non-volatile memory each time a valid word is received and successfully decoded. A flag can now be set to relax Wa and Wr for all encoders which have already been learnt, for one auto re-synchronisation action. A check is carried out that the encoder timer has increased beyond what was stored at the reception of the previous valid transmission word from the corresponding encoder.

Another option is to enforce the change of the CBC value at the encoder or the re-synchronisation of the decoder Tr values by operating a transmitter while in the open state.

In another variation the decoder can use a timer value from the next valid and previously learnt encoder activating it after the reset, to readjust its main timer. All Tr values (for other learnt encoders) would automatically come into play again. This can be done with some provision for error by adjusting the decoder for only 99% of the perceived lost time as can be derived from this single encoder timer. This is because it is far more difficult to handle encoders with timers lagging the decoder timer than for encoders with timers which lead the decoder timer.

Decoder: Learn Mode

The decoder learn operation is discussed with reference to FIG. 12. The decoder must be instructed to switch from normal operation to learning mode and typically this is done using an input switch 100 (see FIG. 3). Once the activation of the input switch is detected (400), the switch is debounced (402) to confirm that the input is activated. The input for the learn mode can operate on an interrupt basis or it can be tested from time to time in the program flow during normal operation of the decoder.

Once the learn mode has been confirmed (404) the decoder must receive sufficient transmission words to construct the CBC value that may not necessarily be completely included in every transmission word (406). If this process fails due to the transmission terminating before the complete CBC value has been received or due to the incorrect reception of code words, the learning process is abandoned (408) and the process returns to step 402 to verify that the learning mode is still selected. The decoder timer is also read for reference.

If sufficient information is received to construct the CBC value (410) then the control unit 82 (see FIG. 3) constructs the cold boot counter value and reads the timer data Td from the timer 86 (step 412). The control unit then calculates (step 414) the decryption key using the serial number, the CBC count and other information transferred via the transmission values. This key is used in the decryption process (414) to obtain the data word including the user derived information, commands and encoded timer information.

In a step 416 the data is checked to see if it conforms to requirements. A further transmission a short time later may be required to verify the timer movement. Once accepted as a valid learn the relevant information is stored into the decoder non-volatile memory 90. This includes the Tr value (the relationship between the encoder and decoder timers) and the Te of the last valid received data word.

The decoder may indicate (step 418) the status of the learning process on some indicator to the user, eg. an LED. The completion of the learning process of an encoder can also be indicated in the same way.

This aforementioned process can be repeated to enable the learning of several encoders. The information from each encoder may be written to memory in a first-in, first-out sequence (FIFO) as is shown in FIGS. 7 and 8.

In the aforementioned sequence it is not possible to perform selective erasing of encoders. It is possible though to erase the oldest encoder by the addition of a new encoder, once the memory for learned encoders is full. A further command to erase all learn encoders may be implemented.

Encoder: Setting "User Derived Information"

FIG. 13 illustrates process steps in setting user derived information at the encoder 10.

When the encoder is powered up (450) a check is performed on internal non-volatile memory 12 (see FIG. 1) to determine if the user derived information ("UDI") has already been set. If not, the encoder can automatically enter a UDI setting mode. In a variation the encoder can check if a special set of inputs has been activated (452) to cause the encoder to enter the UDI setting mode. If not the encoder proceeds with normal operation (454).

If special inputs are active (456) the encoder activates the high speed timer (HST) in a step (458). In a particular example the period for which the inputs are active is used to determine a value by stopping the HST changing at the time the inputs change (460). The substantially random value in the HST can be read and used as a UDI value (462) to construct (464) a user defined information word which can then be stored (466) in the encoder non-volatile memory before proceeding with normal operation (454).

The preceding description relates to a situation wherein the transmitter has a timer and the receiver has a timer. If an existing counter-based security system is to be upgraded to a timer-based security system then it is necessary to provide a dual capability so that the timer-based system can also be used with, and be compatible to, a counter-based system.

To achieve this a timer-based transmitter is designed to work with a non-timer-based system (ie. counter-based), and with a timer-based system.

The timer in the transmitter counts normally when powered up. When the transmitter is "learnt" to the receiver, the decoder at the receiver accepts any value which is assigned for the purpose or which otherwise is presented to the decoder. Hence the decoder does not distinguish between counter-based and timer-based information. The need to synchronise the starting of the transmitter and receiver is therefore done away with.

The transmitter timer is then operated for a period which is limited or controlled to ensure that the timer information is kept within the automatic re-synchronisation window of the count-based system (ie. the earlier system which is to be upgraded).

When the transmitter time value reaches a point at which it will go outside the window, the timer stops. Consequently, upon the next activation of the transmitter, the timer value which is used will be viewed by the previous (counter-based) system as a count value which is still within the limits of the automatic re-synchronisation window, and hence will be accepted.

This procedure can be implemented until such time as a full timer-based system can be adopted.

The invention claimed is:

1. A method of securely transferring data from an encoder to a decoder, said encoder including an encoder timer and said decoder including a decoder timer, said method including the steps of:

(a) during a learning process receiving a value of said encoder timer at said decoder and determining a mathematical difference value between said value of said encoder timer and a value of said decoder timer;

(b) storing said mathematical difference value as a timer relationship value in said decoder;

(c) at the encoder encrypting a data word to form a transmission word, said data word including information identifying a present value of said encoder timer;

(d) transmitting the transmission word to the decoder;

(e) at the decoder decrypting the transmission word; and (f) determining a mathematical difference value between said present encoder timer value and a present decoder timer value; and g) validating the transmission word by comparing the mathematical difference value between said present encoder timer value and said present decoder timer value with said timer relationship value stored in said decoder.

2. A method according to claim 1 wherein the timer relationship value in the decoder is updated upon receipt of a valid transmission word to remove any discrepancies in the relationship between the encoder timer, decoder timer and the timer relationship value, without affecting the decoder timer.

3. A method according to claim 2 wherein the updating of the timer relationship value is only done when necessary.

4. A method according to claim 2 wherein the data word additionally includes at least one of the following: identity information pertaining to the encoder; command information; utility information; cold boot counter information; fixed code information; encoder power supply information and user derived information.

5. A method according to claim 4 wherein the user derived information is variable via one or more inputs to the encoder and is not known to a manufacturer of the encoder.

6. A method according to claim 2 wherein the timer relationship value is allowed a window when validation of the transmission word occurs and the timer relationship value is adjusted based on knowledge of drift between the encoder timer, the decoder timer and the time period elapsed since a previous valid transmission of a transmission word.

7. A method according to claim 6 wherein the window size is dynamically adjusted and such adjustment is based on the time period elapsed since the previous adjustment of the timer relationship value.

8. A method according to claim 7 wherein the window size has a minimum value.

9. A method according to claim 7 wherein the window size has a maximum value.

10. A method according to claim 1 wherein the transmission word includes the encrypted data word and at least one of the following: a cold boot counter value; command information; and identity information pertaining to the encoder.

11. A method according to claim 10 wherein the cold boot counter value, when included in the transmission word, is transmitted in the clear.

12. A method according to claim 1 which includes the step of keeping the encoder and decoder in synchronism using a cold boot counter which is changed each time the encoder is powered up or comes out of reset.

13. A method according to claim 1 which includes the steps of keeping the encoder and decoder in synchronism using a cold boot counter which is changed each time the encoder is powered up or comes out of reset, and including a count value of the cold boot counter in the transmission word.

14. A method according to claim 1 which includes the step of forming a plurality of transmission words, each transmission word being different from the other transmission words and being based at least on respective encoder high speed timer information, in response to a single activation of the encoder.

15. A method according to claim 1 which includes the step of forming only a single transmission word to be transmitted at least once in response to a single activation of the encoder.

16. A method according to claim 1 which includes the steps, during a learn mode, of storing learning information at the decoder which is transferred from the encoder, and deriving a key from the stored information.

17. A method according to claim 16 wherein the learning information is stored in a first-in-first-out structure.

18. A method according to claim 1 wherein multiple encoders are used with a single decoder comprising a single timer and multiple timer relationship values and wherein the various timer relationship values are determined, one for each encoder during its respective learning process.

19. A method according to claim 18 wherein, if the decoder timer lies within a predetermined window when a valid transmission word is received, the decoder timer is re-synchronised with the encoder timer by automatically adjusting the timer relationship value to remove any discrepancies in the relationship between the timers and the timer relationship value.

20. A method according to claim 19 wherein the re-synchronization is effected by a bi-directional transfer of data between the encoder and decoder.

21. A method according to claim 1 which includes the step of ensuring that the encoder timer at its slowest variance is faster than the decoder timer at its fastest variance.

22. A method according to claim 1 wherein the timer relationship value or a window is adjusted in size to compensate for drift between the encoder timer and the decoder timer, before validation occurs, such adjustment being based at least on the time period elapsed since the last adjustment of the timer relationship value.

23. A method according to claim 1 wherein the timer relationship value or a window is adjusted in size to compensate for drift between the encoder timer and the decoder timer, such adjustment being based at least on information about the drift between the encoder timer and the decoder timer determined by analysing at least two successive valid transmissions received with a period of time elapsed between them and said adjustment being performed before carrying out step (f) on a currently received transmission word.

24. A method according to claim 1 wherein a window size is assigned to the decoder and the encoder timer is operated to ensure that the encoder timer information does not fall outside the window for a valid transmission of a transmission word in normal operational circumstances.

25. A method according to claim 1 wherein the transmission data word also includes a timer value that changes fast so that each transmission word in a sequence of transmission words which are transmitted based on a single continuous activation of the encoder, differs from the other transmission words.

26. A method according to claim 1 wherein a higher security re-synchronization of the encoder and decoder timers is achieved at least by using the decoder to generate control signals that are used to, directly or indirectly, control the activation of the encoder.

27. For use in the method of claim 1, a transmitter which includes an encoder timer and an encryption unit for encrypting data which at least in part is based on timer information from the encoder timer thereby to form the transmission word, and wherein the encoder timer is permitted to run only for a limited period after each activation of the transmitter.

28. For use in the method of claim 1, a transmitter which includes an encoder timer and an encryption unit for encrypting data which at least in part is based on timer information from the encoder timer thereby to form the transmission word and wherein, when the encoder timer runs beyond a predetermined limit, the transmitter will upon a single activation transmit more than one transmission value equivalent to the transmitter being activated twice.

29. For use in the method of claim 1, a decoder which includes a timer, an input to receive the transmission word, a decryption unit to decrypt the transmission word and obtain the transmitted timer information, memory to store the timer relationship value and a comparison unit to compare the transmitted timer information to time information generated by the decoder timer and to the stored timer relationship value, and means, responsive to the comparison unit, to activate an output if certain criteria are met in the comparison.

30. A method according to claim 1, which includes the step of keeping the encoder and decoder in synchronism using a cold boot counter which is changed each time at least one of the following occurs: the encoder is powered up or comes out of reset, or loses the integrity of its timer/counter unit; and wherein the transmission word includes the encrypted data word and at least a cold boot counter value that may be broken up so that several transmission words are required to transfer the complete cold boot counter value.

31. A method according to claim 30 wherein the cold boot counter value, or part thereof when included in the transmission word, is transmitted in the clear.

32. A method according to claim 30, further including a count value of the cold boot counter in the transmission word.

33. Apparatus for transferring data which includes an encoder and a decoder and wherein the encoder includes a timer and an encryption unit for encrypting data which includes timer information from the encoder timer, thereby to form a transmission word, and the decoder includes a decoder timer, a receiver unit for receiving the encrypted transmission word, a decryption unit for decrypting the received transmission word to extract, at least, the timer information from the encoder, a difference determination unit for determining a mathematical difference value between said encoder timer value and said decoder timer value, and a comparator unit for comparing said mathematical difference value and a timer relationship value stored in said decoder, to determine the validity of the transmission word, the timer relationship value being established during a learning process of the encoder and decoder and being representative of a mathematical difference between a value of said encoder timer that is received by said decoder during said learning process and a value of said decoder timer during said learning process.

34. Apparatus according to claim 33 which includes a unit for adjusting the timer relationship value when a valid transmission word is received to remove at least one of:

(a) any drift that has occurred; and (b) any other accumulating discrepancy in the relationship between the encoder timer, decoder timer and the timer relationship value.

35. Apparatus according to claim 33 wherein the timer relationship value is adjusted before checking the validity of a received transmission word, such adjustment being based at least on a known drift between the encoder timer and the decoder timer as well as the time elapsed since a previous adjustment of the timer relationship value.

36. Apparatus according to claim 33 wherein the decoder is assigned a window size which determines acceptable drift between the encoder timer and decoder timer for a valid transmission.

37. Apparatus according to claim 36 wherein the window size is adjusted before checking the validity of a received transmission word, said adjustment being based at least on the time period elapsed since the reception of a previously received valid transmission word.

38. Apparatus according to claim 33 wherein a re-synchronisation of the encoder and decoder can be achieved by the decoder providing control signals for the encoder inputs.

* * * * *